United States Patent
Van Lieshout

[19]

[11] Patent Number: 6,084,789
[45] Date of Patent: Jul. 4, 2000

[54] COMBINED CAPACITIVE UP/DOWN CONVERTER

[75] Inventor: Petrus J. G. Van Lieshout, Eindhoven, Netherlands

[73] Assignee: U.S. Philips Corporation, New York, N.Y.

[21] Appl. No.: 09/296,721

[22] Filed: Apr. 22, 1999

[30] Foreign Application Priority Data

Apr. 24, 1998 [EP] European Pat. Off. ............. 98201344

[51] Int. Cl.$^7$ .................................................. H02M 3/18
[52] U.S. Cl. ................................................. 363/60; 307/110
[58] Field of Search ................................. 363/59, 60, 62; 307/110; 327/536

[56] References Cited

U.S. PATENT DOCUMENTS

| | | | |
|---|---|---|---|
| 4,389,704 | 6/1983 | Sasaki | 363/62 |
| 4,802,739 | 2/1989 | Iwamoto | 345/87 |
| 5,095,223 | 3/1992 | Thomas | 307/110 |
| 5,262,934 | 11/1993 | Price | 363/60 |
| 5,461,557 | 10/1995 | Tamagawa | 363/60 |
| 5,463,542 | 10/1995 | Okamoto | 363/60 |
| 5,493,543 | 2/1996 | Kamens | 368/255 |
| 5,606,491 | 2/1997 | Ellis | 363/60 |
| 5,760,637 | 6/1998 | Wong et al. | 327/536 |
| 5,761,058 | 6/1998 | Kanda et al. | 363/60 |
| 5,790,393 | 8/1998 | Fotouhi | 363/60 |
| 5,831,845 | 11/1998 | Zhou et al. | 363/60 |
| 5,870,295 | 2/1999 | Watanabe | 363/60 |
| 5,877,948 | 3/1999 | Dijkmans | 363/60 |

FOREIGN PATENT DOCUMENTS

0461717A1  12/1991  European Pat. Off. .

Primary Examiner—Adolf Deneke Berhane
Attorney, Agent, or Firm—Steven R. Biren

[57] ABSTRACT

A switched capacitive voltage converter for converting an input voltage ($U_i$) between an input terminal (I) and reference terminal (RF) to an output voltage ($U_o$) between an output terminal (O) and the reference terminal (RF). The voltage converter comprises only two capacitors ($C_1$, $C_2$) and five switches ($S_1$–$S_5$). The first ($S_1$) and the second switch ($S_1$) are coupled in series between the input terminal (I) and the output terminal (O). The third ($S_3$) and the fifth ($S_5$) switch are also coupled between the input terminal (I) and the output terminal (O). The first capacitor ($C_1$) is coupled in series between a node common to the first ($S_1$) and the second ($S_2$) switches and a node common to the third ($S_3$) and the fifth ($S_5$) switch. The fourth switch ($S_4$) is coupled between the node common to the third ($S_3$) and the fifth ($S_5$) switch and the reference terminal (RF). The second capacitor ($C_2$) is coupled between the output terminal (O) and the reference terminal (RF). The voltage converter disclosed herein can operate as an up converter, a down converter as well as a buffer.

6 Claims, 2 Drawing Sheets

COMBINED CAPACITIVE UP/DOWN CONVERTER

BACKGROUND OF THE INVENTION

The invention relates to a switched capacitive voltage converter for converting an input voltage between an input terminal and reference terminal to an output voltage between an output terminal and the reference terminal.

Switched capacitive voltage converters of the type defined in the opening paragraph are known from the general state of the art. Switched capacitive voltage converters are used inter alia in battery-powered apparatuses, in which a high efficiency is important, because they make it possible to realize converters which have a high efficiency and which, in addition, generate low-level electromagnetic fields (also briefly referred to as EM fields), unlike converters which use a coil for the storage of energy.

For certain uses it is necessary to convert the input voltage to a higher output voltage. For these uses it is possible to employ, for example, switched capacitive voltage converters as described in European Patent Specification EP 0 461 717 A1. For other uses it is desirable to convert the input voltage to a lower output voltage. For the last-mentioned uses it is possible to employ, for example, switched capacitive voltage converters as described in U.S. Pat. No. 4,389,704.

There are also uses, such as for example the so-called class G audio amplifiers, where it is desirable for reasons of efficiency that at a given instant the input voltage is converted to a higher output voltage and at another instant the input voltage is converted to a lower output voltage.

A drawback of the switched capacitive voltage converters as described in said European Patent Specifications is that they can operate solely as an up converter and a down converter, respectively, but not as a combined up/down converter.

Switched capacitive up/down converters are known from the general state of the art but these are made up of a separate opening converter and a separate down converter. A drawback is that they require a comparatively large number of components. Particularly in the case of use in an integrated circuit (IC) it is important to minimize the number of capacitive elements because these elements occupy a comparatively large portion of the required chip area.

Another drawback of the afore-mentioned capacitive up/down converters in accordance with the generate state of the art is that they require a comparatively large number of IC pins for the connection of external components.

A further drawback of the afore-mentioned capacitive up/down converters in accordance with the general state of the art is that they dissipate comparatively much power.

SUMMARY OF THE INVENTION

It is an object of the invention to provide a combined capacitive up/down converter which does not have the afore-mentioned drawbacks. To this end, according to the invention, the switched capacitive voltage converter of the type defined in the opening paragraph is characterized in that the switched capacitive voltage converter comprises: a first capacitive element; a second capacitive element coupled between the output terminal and the reference terminal; first switching means coupled between the input terminal and a first electrode of the first capacitive element; second switching means coupled between the output terminal and the first electrode of the first capacitive element; third switching means coupled between the output terminal and a second electrode of the first capacitive element; first switching means coupled between the first electrode of the first capacitive element and the reference terminal; and fifth switching means coupled between the input terminal and the second electrode of the first capacitive element. Thus, it is achieved in a simple manner that a switched capacitive voltage converter having only two capacitive elements and five switching means is obtained which at option operates in one of the following three modes: up conversion, down conversion, or buffering, in which last-mentioned mode the output voltage is substantially equal to the input voltage. As, in contradistinction to the switched capacitive voltage converter in accordance with the general state of the art, the switched capacitive voltage converter in accordance with the invention always operates in only one of the three aforementioned modes the current consumption and, consequently, also the dissipation is low. In which of the three modes the switched capacitive voltage converter operates is determined by the patterns of switching signals which control the first, the second, the third, the fourth and the fifth switching means.

The switched capacitive voltage converter defined in the opening paragraph is further characterized in that the first, the second, the third, and the fourth switching means are adapted to alternately couple either the first electrode of the first capacitive element to the input terminal and the second electrode of the first capacitive element to the output terminal, or the first electrode of the first capacitive element to the output terminal and the second electrode of the first capacitive element to the reference terminal. Thus, its achieved that the switched capacitive voltage converter is in the down conversion mode.

The switched capacitive voltage converter defined in the opening paragraph is further characterized in that the first, the second, the fourth and the fifth switching means are adapted to alternately couple either the first electrode of the first capacitive element to the input terminal and the second electrode of the first capacitive element to the reference terminal, or the first electrode of the first capacitive element to the output terminal and the second electrode of the first capacitive element to the input terminal. Thus, its achieved that the switched capacitive voltage converter is in the up conversion mode.

The switched capacitive voltage converter defined in the opening paragraph is further characterized in that the first and the second switching means are adapted to couple the input terminal to the output terminal. Thus, its achieved that the switched capacitive voltage converter is in the buffer mode.

The patterns of switching signals can be fixed so as to achieve that the switched capacitive voltage converter is always in the same mode, for example up conversion. However, it is also possible to make the mode dependent on the values of the input voltage and of the desired output voltage, respectively. In this way, it is also possible to make the output voltage adjustable, the desired mode being set automatically.

The switched capacitive voltage converter defined in the opening paragraph is further characterized in that at least one of the first, the second, the third, the fourth and the fifth switching means is realized by means of a DMOS transistor. The afore-mentioned switching means in a switched capacitive voltage converter in accordance with the invention can be equipped with various types of switches, for example, they can also be realized by means of transistors. If the switching means employ DMOS transistors (Double diffused MOS transistors) this has the advantage that the switching losses are lower because the DMOS transistors have a low forward resistance. Another reason for the use of DMOS transistors is that they can handle high voltages and large currents.

DMOS transistors have an intrinsic diode in anti-parallel with their drain-source channel. In some situations the intrinsic diode may become undesirably conductive as a result of which the switched capacitive voltage converter will not function in an optimum manner. In order to avoid this risk, the switched capacitive voltage converter defined in the opening paragraph can further be characterized in that at least one of the first, the second, the third, the fourth and the fifth switching means is realized by means of a DMOS transistor coupled in anti-series.

BRIEF DESCRIPTION OF THE DRAWING

The invention will be described in more detail with reference to the accompanying drawings, in which.

In these Figures parts or elements having a like function or purpose bear the same reference symbols.

DESCRIPTION OF THE PREFERRED EMBODIMENT

Figure 1:
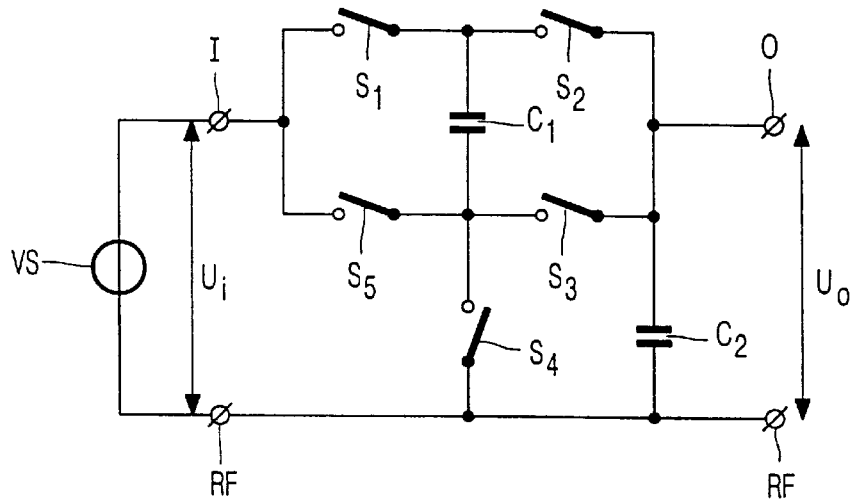
FIG. 1 shows an electrical circuit diagram of an embodiment of a switched capacitive voltage converter in accordance with the invention.

FIG. 1 shows an electrical circuit diagram of an embodiment of a switched capacitive voltage converter (hereinafter referred to as voltage converter) in accordance with the invention. The voltage converter has an input terminal I and a reference terminal RF for receiving an input voltage $U_i$. The voltage converter converts the input voltage $U_i$, which is supplied by a voltage source VS, into an output voltage $U_o$ between an output terminal O and the reference terminal RF. The voltage converter further comprises first to fifth switching means having first to fifth switches $S_1$–$S_5$. The voltage converter further includes a first capacitive element, i.e. a first capacitor $C_1$, and a second capacitive element; i.e. a second capacitor $C_2$. The first switch $S_1$ has one end connected to the input terminal I and its other end to a first electrode of the first capacitor $C_1$. The second switch $S_2$ has one end connected to the first electrode of the first capacitor $C_1$ and its other end to the output terminal O. The third switch $S_3$ has one end connected to the second electrode of the first capacitor $C_1$ and the output terminal O. The fifth switch $S_5$ has one end connected to the input terminal I and its other end to the second electrode of the first capacitor $C_1$. The fourth switch $S_4$ is connected between the second electrode of the first capacitor $C_1$ and the reference terminal RF. The second capacitor $C_2$ is connected between the output terminal O and the reference terminal RF. Each of the switches $S_1$–$C_5$ can be in a permanently open or closed state or in a periodically alternating open and closed state. Thus, the voltage converter has three possible modes, namely an up conversion mode, a down conversion mode or a buffer mode.

Figure 2:
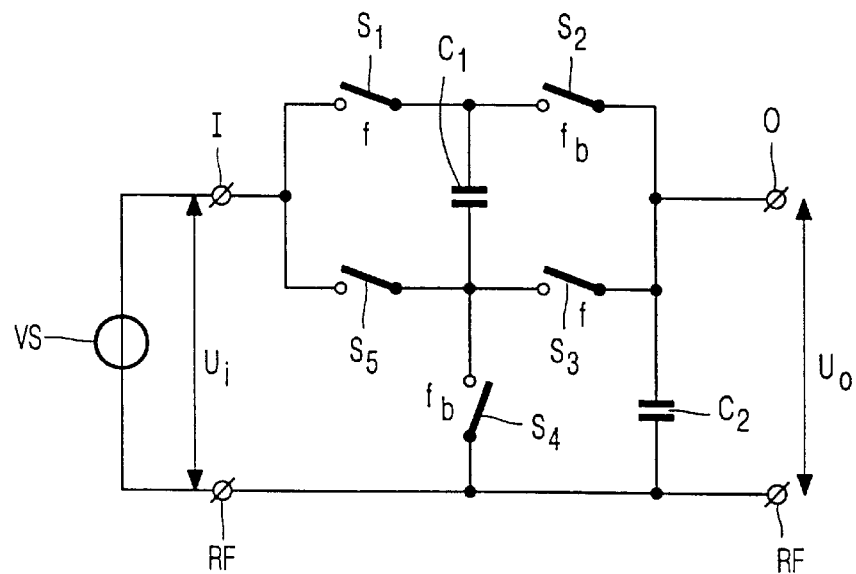
FIG. 2 shows the electrical circuit diagram of the embodiment of the switched capacitive voltage converter of FIG. 1, to clarify the operation of the switched capacitive voltage converter when it is in the down conversion mode.

FIG. 2 shows the situation in which the voltage converter is in the down conversion mode. In this mode the first to the fourth switch $S_1$–$S_4$ are alternately opened and closed periodically and the fifth switch $S_5$ is permanently open. The first and the third switch $S_1$, $S_3$ are opened and closed in phase with one another (which is indicated by the reference symbol "f"), while the second and the fourth switch $S_2$, $S_3$ are opened and closed in phase opposition to one another (which is indicated by the reference symbol "$f_b$"). The output voltage $U_o$ can be calculated by means of formula [1]:

$$U_o = \{2*C_1*C_2/(C_1+C_2)^2\}*U_i \qquad [1]$$

In formula [1] $C_1$ and $C_2$ represent the capacitance values of the first capacitor $C_1$ and the second capacitor $C_2$. The output voltage $U_o$ is at the most equal to half the input voltage $U_i$. This is reached when the capacitance value $C_1$ is equal to the capacitance value $C_2$.

Figure 3:
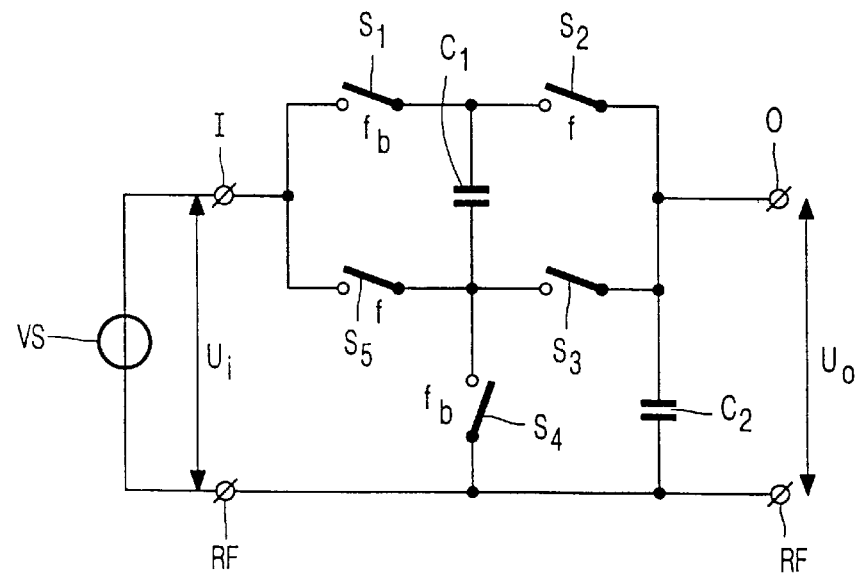
FIG. 3 shows the electrical circuit diagram of the embodiment of the switched capacitive voltage converter of FIG. 1, to clarify the operation of the switched capacitive voltage converter when it is in the up conversion mode.

FIG. 3 shows the situation in which the voltage converter is in the up conversion mode. In this mode the first, the second, the fourth and the fifth switch $S_1$, $S_2$, $S_4$, $S_5$ are alternately closed and opened periodically and the third switch $S_3$ is permanently open. The second and the fifth switch $S_2$, $S_5$ are opened and closed in phase with one another (which is indicated by the reference symbol "f"), while the second and the fourth switch $S_2$, $S_3$ are opened and closed in phase opposition (which is indicated by the reference symbol "$f_b$") with respect to the second and the fifth switch $S_2$, $S_5$. The output voltage $U_o$ is (approximately) twice as high as the input voltage $U_i$.

Figure 4:
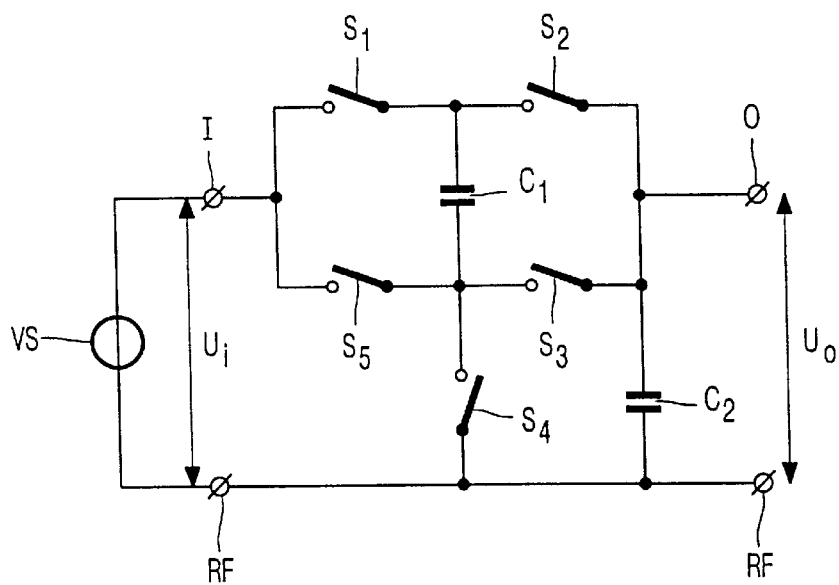
FIG. 4 shows the electrical circuit diagram of the embodiment of the switched capacitive voltage converter of FIG. 1, to clarify the operation of the switched capacitive voltage converter when it is in the buffer mode.

FIG. 4 shows the situation in which the voltage converter is in the buffer mode. In this mode the first and the second switch $S_1$, $S_2$ are permanently closed and the third and the fifth switch $S_3$, $S_5$ are permanently open. Whether the fourth switch $S_4$ is permanently closed, permanently open, or is alternately opened and closed periodically is in principle irrelevant, in all the cases the voltage converter is in the buffer mode and the output voltage $U_o$ is (substantially) equal to the input voltage $U_i$. However, it is advisable to keep the fourth switch $S_4$ permanently closed. In that case the first and the second capacitor $C_1$, $C_2$ are arranged in parallel and together form a smoothing capacitance for the output voltage $U_o$.

Figure 5:
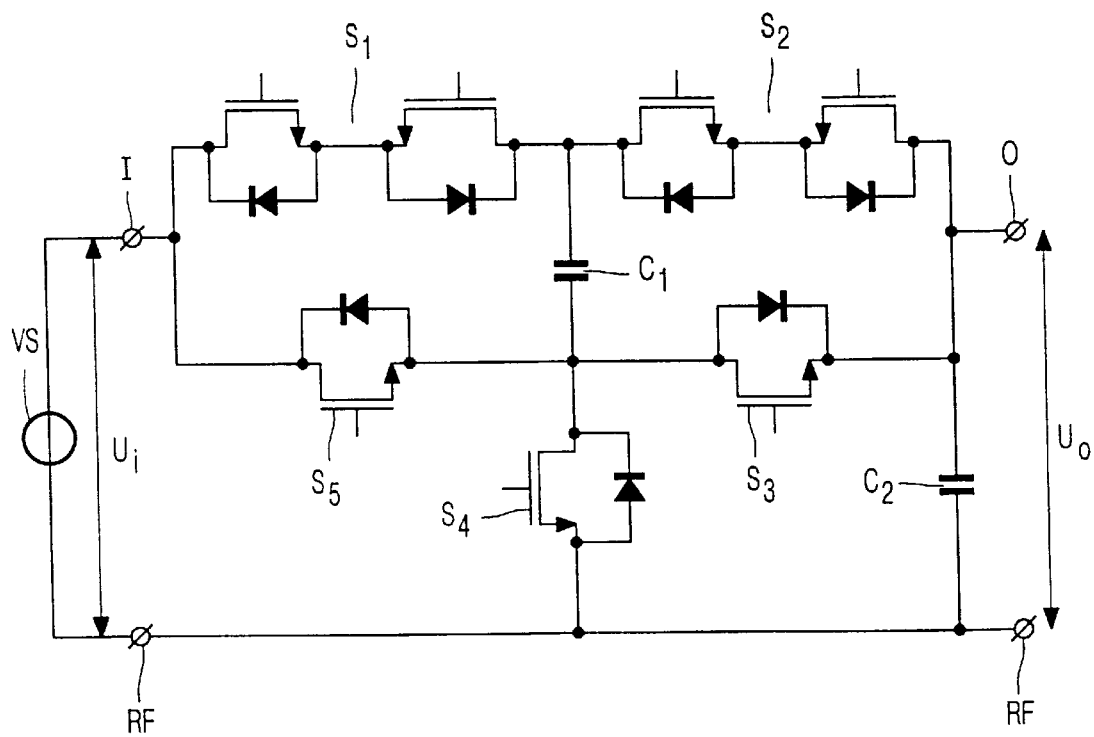
FIG. 5 shows a specific form of a switched capacitive voltage converter in accordance with the invention.

FIG. 5 shows a specific form of the voltage converter in accordance with the invention. The first to the fifth switch $S_1$ to $S_5$ are formed by means of DMOS transistors. In order to prevent undesired conduction of the intrinsic diodes of the DMOS transistors one or more of the switches $S_1$ to $S_5$ can be realized by means of DMOS transistors coupled in ant-series. In FIG. 5 this has been done, by way of example, for the first and the second switch $S_1$, $S_2$.

For the first to the fifth switch $S_1$ to $S_5$ various electronic components such as relays, diodes, transistors and thyristors can be used. The voltage converter in accordance with the invention can be realized as an integrated circuit but also by means of discrete components.

What is claim is:

1. A switched capacitive voltage converter for converting an input voltage ($U_i$) between an input terminal (I) and reference terminal (RF) to an output voltage ($U_o$) between an output terminal (O) and the reference terminal (RF), characterized in that the switched capacitive voltage converter comprises: a first capacitive element ($C_1$); a second capacitive element ($C_2$) coupled between the output terminal (O) and the reference terminal (RF); first switching means ($S_1$) coupled between the input terminal (I) and a first electrode of the first capacitive element ($C_1$); second switching means ($S_2$) coupled between the output terminal (O) and the first electrode of the first capacitive element ($C_1$); third switching means ($S_3$) coupled between the output terminal (O) and a second electrode of the first capacitive element ($C_1$); fourth switching means ($S_4$) coupled between the second electrode of the first capacitive element ($C_1$) and the reference terminal (RF); and fifth switching means ($S_5$) coupled between the input terminal (I) and the second electrode of the first capacitive element ($C_1$).

2. A switched capacitive voltage converter as claimed in claim 1, characterized in that the first ($S_1$), the second ($S_2$), the third ($S_3$), and the fourth ($S_4$) switching means are adapted to alternately couple either the first electrode of the first capacitive element ($C_1$) to the input terminal (I) and the second electrode of the first capacitive element ($C_1$) to the output terminal (O), or the first electrode of the first capacitive element ($C_1$) to the output terminal (O) and the second electrode of the first capacitive element ($C_1$) to the reference terminal (RF).

3. A switched capacitive voltage converter as claimed in claim 1, characterized in that the first ($S_1$), the second ($S_2$), the fourth ($S_4$) and the fifth ($S_5$) switching means are adapted to alternately couple either the first electrode of the first capacitive element ($C_1$) to the input terminal (I) and the second electrode of the first capacitive element ($C_1$) to the reference terminal (RF), or the first electrode of the first capacitive element ($C_1$) to the output terminal (O) and the second electrode of the first capacitive element ($C_1$) to the input terminal (I).

4. A switched capacitive voltage converter as claimed in claim 1, characterized in that the first ($S_1$) and the second ($S_2$) switching means are adapted to couple the input terminal (I) to the output terminal (O).

5. A switched capacitive voltage converter as claimed in claim 1, characterized in that at least one of the first ($S_1$), the second ($S_2$), the third ($S_3$), the fourth ($S_4$) and the fifth ($C_5$) switching means is realized by means of a DMOS transistor.

6. A switched capacitive voltage converter as claimed in claim 1, characterized in that at least one of the first ($S_1$), the second ($S_2$), the third ($S_3$), the fourth ($S_4$) and the fifth ($C_5$) switching means is realized by means of a DMOS transistor coupled in anti-series.

* * * * *